(12) United States Patent
Liu

(10) Patent No.: US 7,439,565 B2
(45) Date of Patent: Oct. 21, 2008

(54) ACTIVE DEVICES ARRAY SUBSTRATE AND REPAIRING METHOD THEREOF

(75) Inventor: Wen-Hsiung Liu, Pingtung County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 109 days.

(21) Appl. No.: 11/309,007

(22) Filed: Jun. 8, 2006

(65) Prior Publication Data

US 2008/0006858 A1      Jan. 10, 2008

(51) Int. Cl.
*H01L 29/94*       (2006.01)
*H01L 27/108*     (2006.01)

(52) U.S. Cl. ............................ 257/296; 257/59; 257/71; 257/302; 257/350; 257/213; 257/223

(58) Field of Classification Search ................. 257/213, 257/223, 59, 71, 296, 302, 350; 349/40, 349/192

See application file for complete search history.

(56) References Cited

U.S. PATENT DOCUMENTS 5,019,002 A * 5/1991 Holmberg .................... 445/24
6,268,895 B1   7/2001 Shimada et al.
2002/0101547 A1 * 8/2002 Lee et al. ....................... 349/40
2004/0212015 A1 * 10/2004 Huang et al. ................. 257/355
2006/0071243 A1 * 4/2006 Hsu et al. ..................... 257/223

FOREIGN PATENT DOCUMENTS

| CN | 1763948 | 4/2006 |
|---|---|---|
| JP | 09-329796 | 12/1997 |
| JP | 10-123574 | 5/1998 |
| JP | 10-133212 | 5/1998 |

* cited by examiner

*Primary Examiner*—Kiesha Rose
*Assistant Examiner*—Telly D Green
(74) *Attorney, Agent, or Firm*—Jianq Chyun IP Office

(57) ABSTRACT

An active device array substrate including a substrate, a plurality of active devices, a plurality of the first lead lines, a plurality of the second lead lines and a first floating light-shielding layer is provided. The substrate has a display region and a peripheral circuit region and the active devices are arranged within the peripheral circuit region on the substrate to form an array. Besides, the first lead lines and the second lead lines are disposed within the peripheral circuit region on the substrate. The first floating light-shielding layer is disposed between the first lead lines and covers the part of the first lead lines. Furthermore, the floating light-shielding layer is not connected with any voltage sources completely. Therefore, the active devices array substrate can prevent the light leakage from been resulted between the first lead lines and the power consumption of the active devices array substrate is reduced.

18 Claims, 11 Drawing Sheets

ACTIVE DEVICES ARRAY SUBSTRATE AND REPAIRING METHOD THEREOF

BACKGROUND OF THE INVENTION

1. Field of the Invention

The invention relates to an active devices array substrate and repairing method thereof, and more particularly to an active devices array substrate, which can solve the light leakage problem and prevent the electrostatic discharge (ESD) damage from being caused, and the repairing method of this active devices array substrate.

2. Description of the Related Art

Due to the advance of the semiconductor devices and display apparatuses, multimedia technology has dramatically improved. For display devices, liquid crystal display with high-resolution, effective space utilization, low-power consumption, and non-radiation has gradually become the main trend in the market.

The mainly processes of the LCD include a process of a thin film transistors (TFTs) array substrate, a process of a color filter, a process of a liquid crystal cell, and a assembling process of a display module of the LCD. Wherein, the process of the liquid crystal cell includes assembling the TFTs array substrate to the color filter substrate and forming a liquid crystal layer between them.

FIG. 1 is a schematic cross-sectional view showing conventional LCD. In FIG. 1, only the devices need to illustrate are shown. Referring to FIG. 1, conventional LCD at least comprises a thin film transistors array substrate 110, a color filter substrate 120, a black matrix layer 122, a sealant 130, a liquid crystal layer 140, a polarizing plate 152, 154 and an outer frame 160. Wherein, the black matrix layer 122 is disposed on the color filter substrate 120, and the sealant 130 is disposed between the color filter substrate 120 and the TFTs array substrate 110 for sealing the color filter substrate 120 and the TFTs array substrate 110. The liquid crystal layer 140 is disposed in a space bounded by the color filter substrate 120, the TFTs array substrate 110 and the sealant 130.

In addition, polarizing plate 152 and polarizing plate 154 are disposed on the exterior surfaces of the TFTs array substrate 110 and the color filter substrate 120 respectively, and the outer frame 160 is disposed on the polarizing plate 152. It should be noted that the TFTs array substrate 110 can be distinguished into a display region 10 and a peripheral circuit region 20. A plurality of lead lines 112 is disposed within the peripheral circuit region 20 for transmitting signals in the display.

The conventional method of forming the liquid crystal layer 140 includes forming a sealed space between the TFTs array substrate 110 and the color filter substrate 120 by using the sealant 130. Thereafter, liquid crystal is slowly injected in to the aforementioned sealed space through the capillary effect under the atmospheric pressure. Because the injection process is rather slow, it is unsuitable for fabricating large size LCD panel. To increase the speed of the fabrication process, a one drop filling (ODF) method for fabricating LCD panel has been developed. In the ODF method, the sealant 130 is formed on the TFTs array substrate 110 or the color filter substrate 120, then liquid crystal is dropped into an area enclosed by the sealant 130. Thereafter, the TFTs array substrate 110 and the color filter substrate 120 are sealed together. Finally, the sealant 130 is solidified by irradiated with ultraviolet light so bond the substrates together.

To prevent the incompletely solidified sealant 130 from contaminating the liquid crystal 140, the black matrix layer 122 on the color filter substrate 110 is shrunk towards the center of the panel by a distance. However, with the black matrix layer 122 slightly contracted, a light leakage area 170 is formed between the black matrix layer 122 and the sealant 130. In addition, there is no shade in the area between the lead lines 112 within the peripheral circuit region 20. Hence, light 180 emitted from the back light module (not shown) may pass through the areas between the lead lines 112 and produce a vertical or slant light beam at the junction between the outer frame 160 and the TFTs array substrate 110.

SUMMARY OF THE INVENTION

Accordingly, one aspect of the present invention is provided an active devices array substrate without the light leakage between the lead lines within the peripheral circuit region, and the active devices array substrate can avoid the electrostatic discharge (ESD) damage.

Another aspect of the present invention is provided a method for repairing an active devices array substrate. The method is suitable to repair the active devices array substrate of the present invention subjected to electrostatic discharge damage.

The present invention provides an active devices array substrate includes a substrate, a plurality of active devices, a plurality of first lead lines, a plurality of second lead line and a first floating light-shielding layer. The substrate has a display region and a peripheral circuit region surrounding the display region. The plurality of active devices is arranged within the display region on the substrate, and each of the active devices includes a first conductive layer and a second conductive layer. The plurality of the first lead lines is disposed within the peripheral circuit region on the substrate, wherein the first lead lines and the first conductive layers are comprised of the same film layer and connect to each other. The plurality of second lead lines is disposed within the peripheral circuit region on the substrate, wherein the second lead lines and the second conductive layers are comprised of the same film layer and connect to each other. The aforementioned first floating light-shielding layer without connecting to any voltage sources is disposed between the adjacent first lead lines and partially overlaps to the plurality of the first lead lines. The first floating light-shielding layer and the second conductive layers are comprised of the same film layer.

In some embodiments of the present invention, the active devices array substrate further comprises a plurality of first pads disposed within the peripheral circuit region on the substrate. Each of the first pads is electrically connected with one of the first lead lines respectively. The aforementioned first floating light-shielding layer is further disposed between the adjacent first pads.

In some embodiments of the present invention, the active devices array substrate further comprises a plurality of first dummy lead lines, for example. The first dummy lead lines and the first conductive layers are comprised of the same film layer, and there are not any overlaps between the first floating light-shielding layer and the first dummy lead lines.

In some embodiments of the present invention, the active devices array substrate further comprises a second floating light-shielding layer disposed between the adjacent second lead lines and partially overlaps to the plurality of the second lead lines, for example. Wherein, the second floating light-shielding layer is not electrically connected with any voltage sources, and the second floating light-shielding layer and the first conductive layers are comprised of the same film layer.

In some embodiments of the present invention, the active devices array substrate further comprises a plurality of second pads disposed within the peripheral circuit region on the substrate, for example. Each of the second pads is electrically connected with one of the second lead lines respectively. The aforementioned second floating light-shielding layer is further disposed between the adjacent second pads.

In some embodiments of the present invention, the active devices array substrate further comprises a plurality of second dummy lead lines, for example. The second dummy lead lines and the second conductive layers are comprised of the same film layer, and there are not any overlaps between the second floating light-shielding layer and the second dummy lead lines.

In some embodiments of the present invention, wherein the active devices are thin film transistors, for example.

In some embodiments of the present invention, the first conductive layer of one active device, for example, is a gate layer and the second conductive layer of one active device, for example, is a source/drain layer.

In some embodiments of the present invention, the first conductive layer of one active device, for example, is a source/drain layer and the second conductive layer of one active device, for example, is a gate layer.

In some embodiments of the present invention, the active devices array substrate, for example, further comprises an electrostatic discharge (ESD) protection circuit disposed between the display region and the first floating light-shielding layer on the substrate and electrically connected with the first floating light-shielding layer.

In some embodiments of the present invention, the ESD protection circuit, for example, comprises a plurality of protection rings and a connecting wire. The protection rings are electrically connected to each other through the connecting wire, and the first floating light-shielding layer is electrically connected with the protection rings through the connecting wire.

In some embodiments of the present invention, each of the protection rings is electrically connected with one of the first lead lines.

In some embodiments of the present invention, the active devices array substrate, for example, further comprises an ESD protection circuit and a plurality of first electrostatic guiding devices. The ESD protection circuit is electrically connected with the first pads, and the first floating light-shielding layer is disposed between the ESD protection circuit and the display region. Furthermore, the first electrostatic guiding devices are disposed between the ESD protection circuit and the first floating light-shielding layer, wherein each of the first electrostatic guiding devices is electrically connected with the corresponding first pad and the first floating light-shielding layer.

In some embodiments of the present invention, each of the first electrostatic guiding devices, for example, is a transistor with a gate, a drain and a source. The gate and the drain of the transistor are electrically connected with one of the first lead lines, and the source of the transistor is electrically connected with the first floating light-shielding layer.

In some embodiments of the present invention, the active devices array substrate, for example, further comprises an electrostatic dissipation layer covering the partial first pads and disposed between the first electrostatic guiding devices and the first floating light-shielding layer to electrically connected with the first electrostatic guiding devices.

In some embodiments of the present invention, the active devices array substrate, for example, further comprises a plurality of second electrostatic guiding s. The second electrostatic guiding devices are electrically connected between the corresponding first pad, the electrostatic dissipation layer and the first floating light-shielding layer respectively.

In some embodiments of the present invention, each of the second electrostatic guiding devices, for example, is a transistor with a gate, a drain and a source. The gate of the transistor is electrically connected with one of the first pads, and the source and drain of the transistor are electrically connected with the first floating light-shielding layer and the electrostatic dissipation layer respectively.

The present invention provides a method for repairing the active devices array substrate of the present invention. The repairing method includes electrically isolating a portion of the electrostatic dissipation layer without subjecting to the ESD damage from other portions of the electrostatic dissipation layer subjected to the ESD damage.

In some embodiments of the present invention, the electrically isolating method includes, for example, a laser cutting method.

In summary, the active devices array substrate of the present invention has the first floating light-shielding layer disposed between the adjacent first lead lines. Therefore, the light passing through the gaps between the first lead lines can be reduced. In addition, the first floating light-shielding layer has been floating, that is, the first floating light-shielding layer is electrically connected without any voltage sources. Hence, the current consumed by the active devices array substrate of the present invention may be decreased so that the over current can be eliminated.

Moreover, the floating light-shielding layer of the present invention may be collocated with the ESD protection device and the repairing method of the present invention to achieve the objective for preventing the ESD damage caused in the LCD.

It is to be understood that both the foregoing general description and the following detailed description are exemplary, and are intended to provide further explanation of the invention as claimed.

DETAILED DESCRIPTION OF THE EMBODIMENTS

Figure 1:
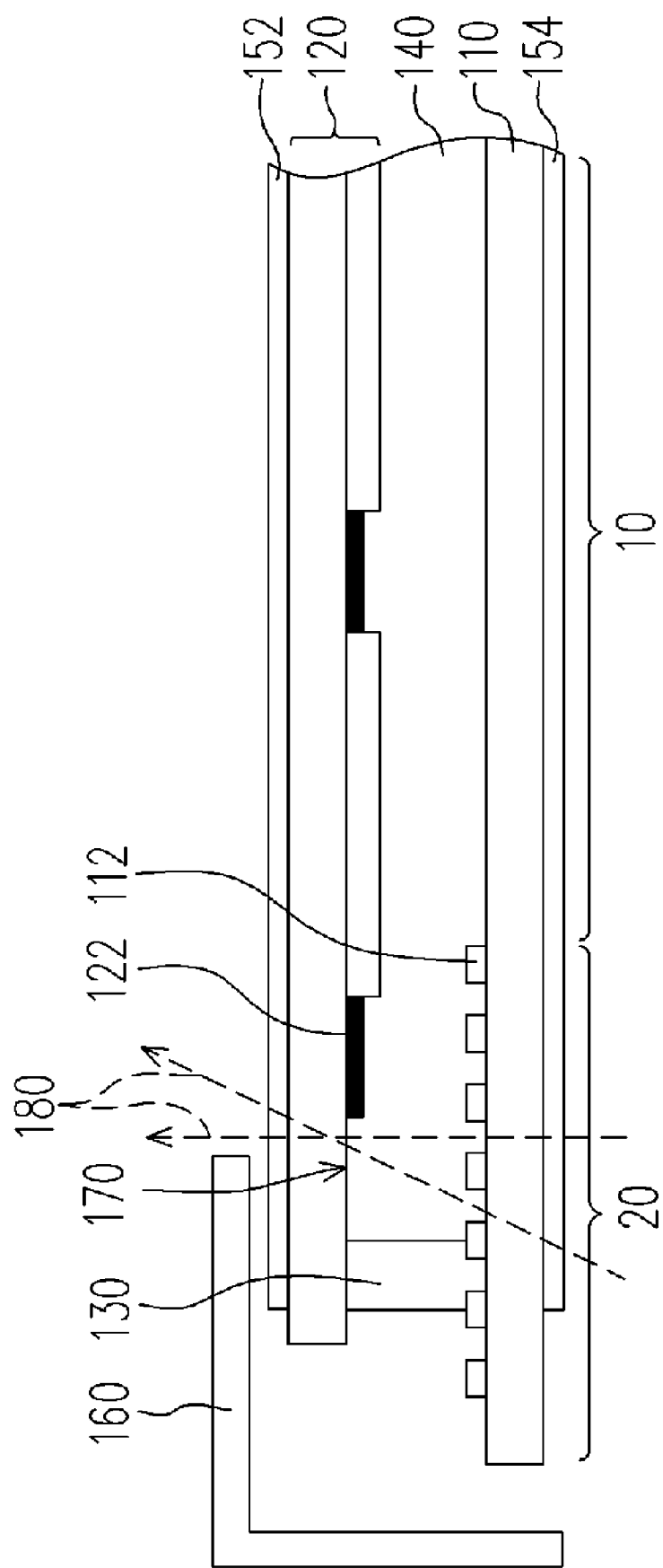
FIG. 1 is a schematic cross-sectional view showing conventional LCD.
Figure 2A:
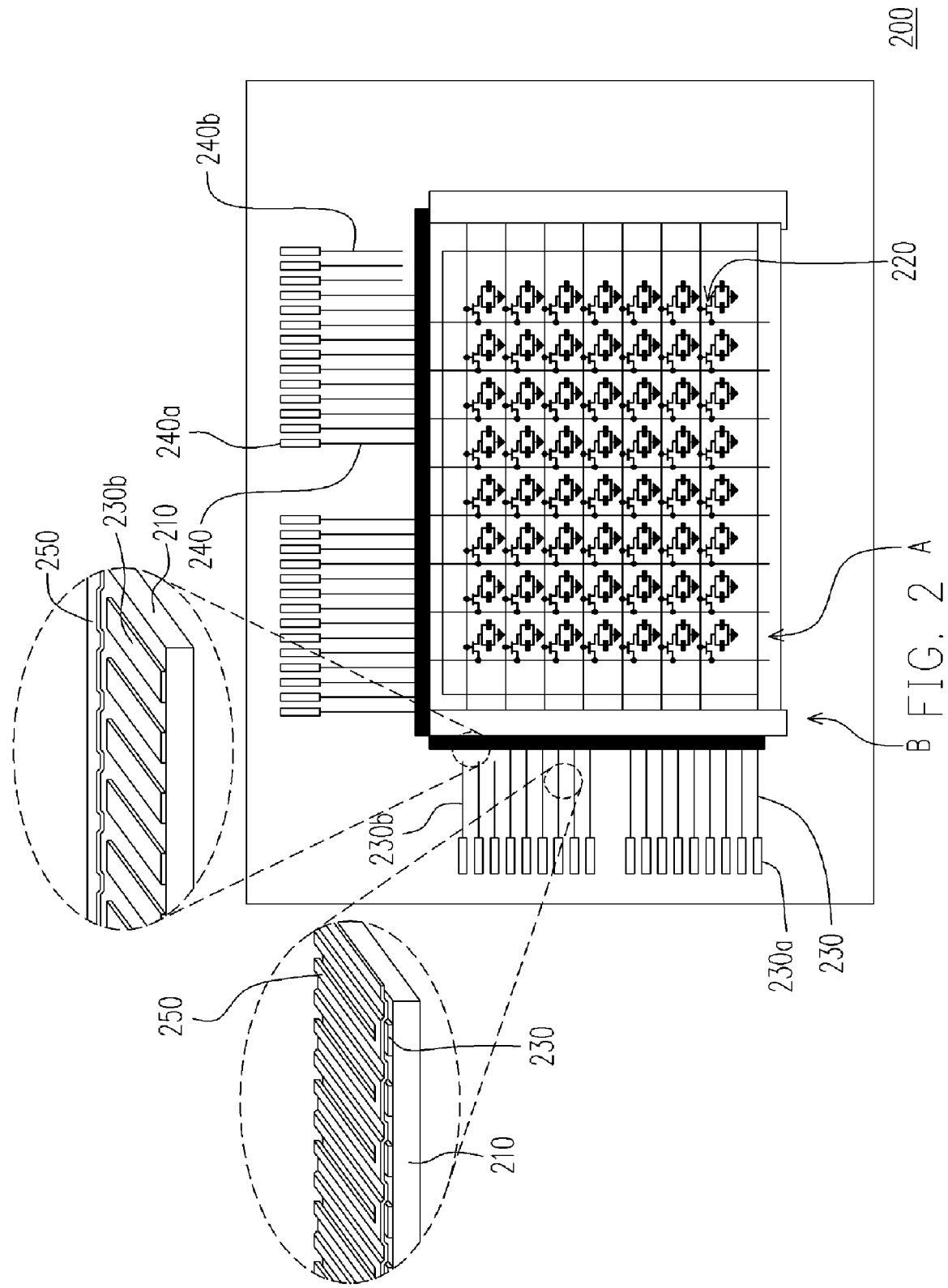
FIG. 2 is a schematic diagram showing an active devices array substrate according to first embodiment of the present invention.
Figure 3:
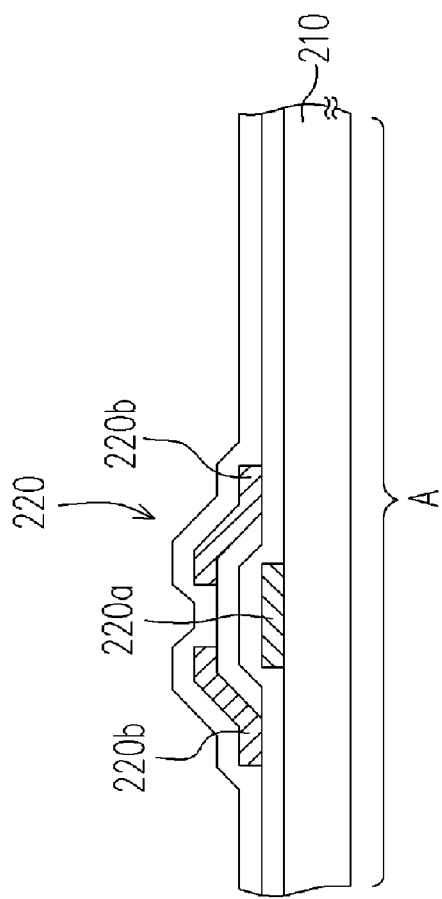
FIG. 3 is a schematically partial cross-sectional view showing an active devices array substrate according to one embodiment of the present invention.
Figure 3:
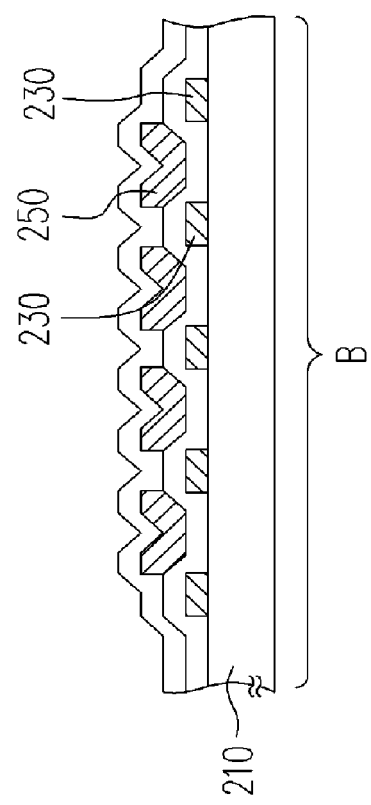

FIG. 2 is a schematic showing an active devices array substrate according to first embodiment of the present invention. FIG. 3 is a schematically partial cross-sectional view showing an active devices array substrate according to one embodiment of the present invention. Referring to FIG. 2 and FIG. 3, the active devices array substrate 200 of the present invention includes a substrate 210, a plurality of active devices 220, a plurality of first lead lines 230, a plurality of second lead lines 240 and a first floating light-shielding layer 250. The substrate 210 has a display region A and a peripheral circuit region B surrounding display region A. The active devices 220 are arranged within the display region A on the substrate 210. Wherein, the active device 220 is, for example, a thin film transistor (TFT). Each of the active devices 220 includes a first conductive layer 220a (as shown in FIG. 3) and a second conductive layer 220b. For convenient illustrating, each of the first conductive layers 220a is considered as a gate layer of the TFT, and each of the second conductive layers 220b is considered as a source/drain layer of the TFT in this embodiment. Obviously, each of the first conductive layers 220a also can be considered as a source/drain layer of the TFT, and each of the second conductive layers 220b can be considered as a gate layer of the TFT in other embodiments.

The first lead lines 230 are disposed within the peripheral circuit region B on the substrate 210. Moreover, one end of each first lead line 230 is electrically connected with a first pad 230a connecting to external circuits, and another end of each first lead line 230 is electrically connected with the first conductive layer 220a. Wherein, the first lead lines 230 and the first conductive layers 220a are comprised of the same film layer. In specific, the first lead lines 230 of this embodiment, for example, are electrically connected with the scan lines within the display region A for transmitting signals into the display region A. Furthermore, the second lead lines 240 are disposed within the peripheral circuit region B on the substrate 210. One end of each second lead line 240 is electrically connected with a second pad 240a, and another end of each second lead line 240 is electrically connected with the second conductive layer 220b. Wherein, the second lead line and the second conductive layer 220b are comprised of the same film layer. The second lead lines 240, for example, are electrically connected with the data lines within the display region A for transmitting signals into the display region A.

Aforementioned first floating light-shielding layer 250 is disposed between the adjacent first lead lines 230 and partially covers the first lead lines 230. It should be noted that the first floating light-shielding layer 250 is not electrically connected to any voltage sources. The first floating light-shielding layer 250 and the second conductive layers 220b are comprised of the same film layer. In other words, the second conductive layers 220b, the second lead lines 240 and the first floating light-shielding layer 250 can be formed simultaneously during the process for fabricating the active devices array substrate 200. Therefore, the gaps between the first lead lines 230 can be sheltered by the first floating light-shielding layer 250 to prevent the light leakage. In addition, since the first floating light-shielding layer 250 is not connected with any voltage sources, the power consumed by the active devices array substrate 200 can be decreased, and the current disturbance problem on the active devices array substrate 200 can be solved so that the display quality of the LCD composed by the active devices array substrate 200 may be maintained.

Referring to FIG. 2, it is usually that a plurality of first dummy lead lines 230b and a plurality of second dummy lead lines 240b are formed with the first lead lines 230 simultaneously during the fabricating process of a LCD. Actually, the first dummy lead lines 230b and the second dummy lead lines 240b are not electrically connected with the scan lines and the data lines formed within the display region A. It should be mentioned that because the ESD damage is easily caused between the floating first dummy lead lines 230b and other conductive layers, there are not any overlaps between the first floating light-shielding layer 250 and the first dummy lead lines 230b in this embodiment, so that the ESD damage can be avoided.

Figure 4:
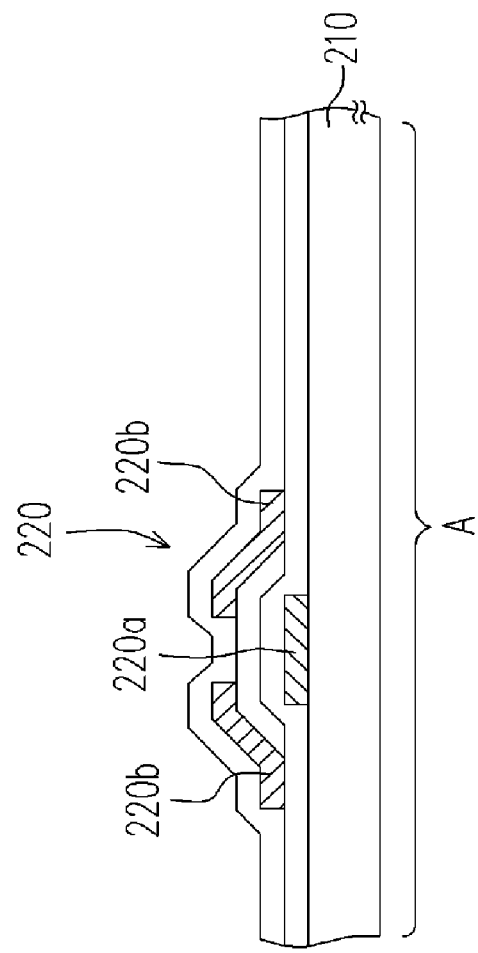
FIG. 4 is a schematic cross-sectional view showing the second floating light-shielding layer according to one embodiment of the present invention.
Figure 4:
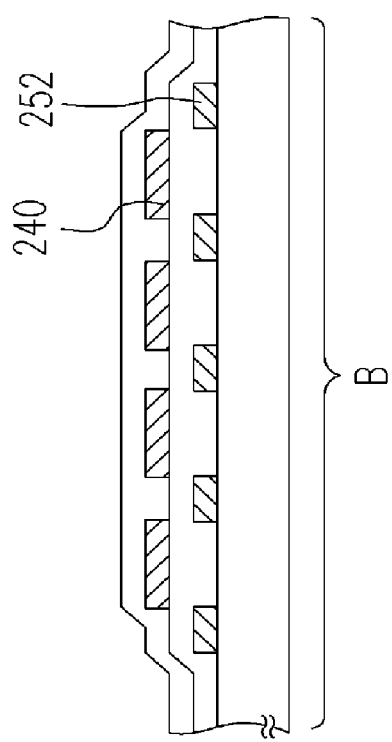

FIG. 4 is a schematic cross-sectional view showing the second floating light-shielding layer according to one embodiment of the present invention. Referring to FIG. 2 and FIG. 4, the gaps between the adjacent second lead lines 240 can be sheltered by a second floating light-shielding layer 252 as well as the gaps between the first lead lines 230 sheltered by the first floating light-shielding layer 250. The second floating light-shielding layer 252 and the second lead lines 240 are overlap partially, and the second floating light-shielding layer 252 is not electrically connected with any voltage sources. Moreover, the second floating light-shielding layer 252 and the first conductive layers 220a are comprised by the same film layer (as shown in FIG. 4). In other words, the first conductive layers 220a, the first lead lines 230 and the second floating light-shielding layer 252 are formed simultaneously during the fabricating process of the active devices array substrate 200. Of course, there are not any overlaps between the second floating light-shielding layer 252 and the second dummy lead lines 240b so that the ESD damage can be avoided.

Figure 5:
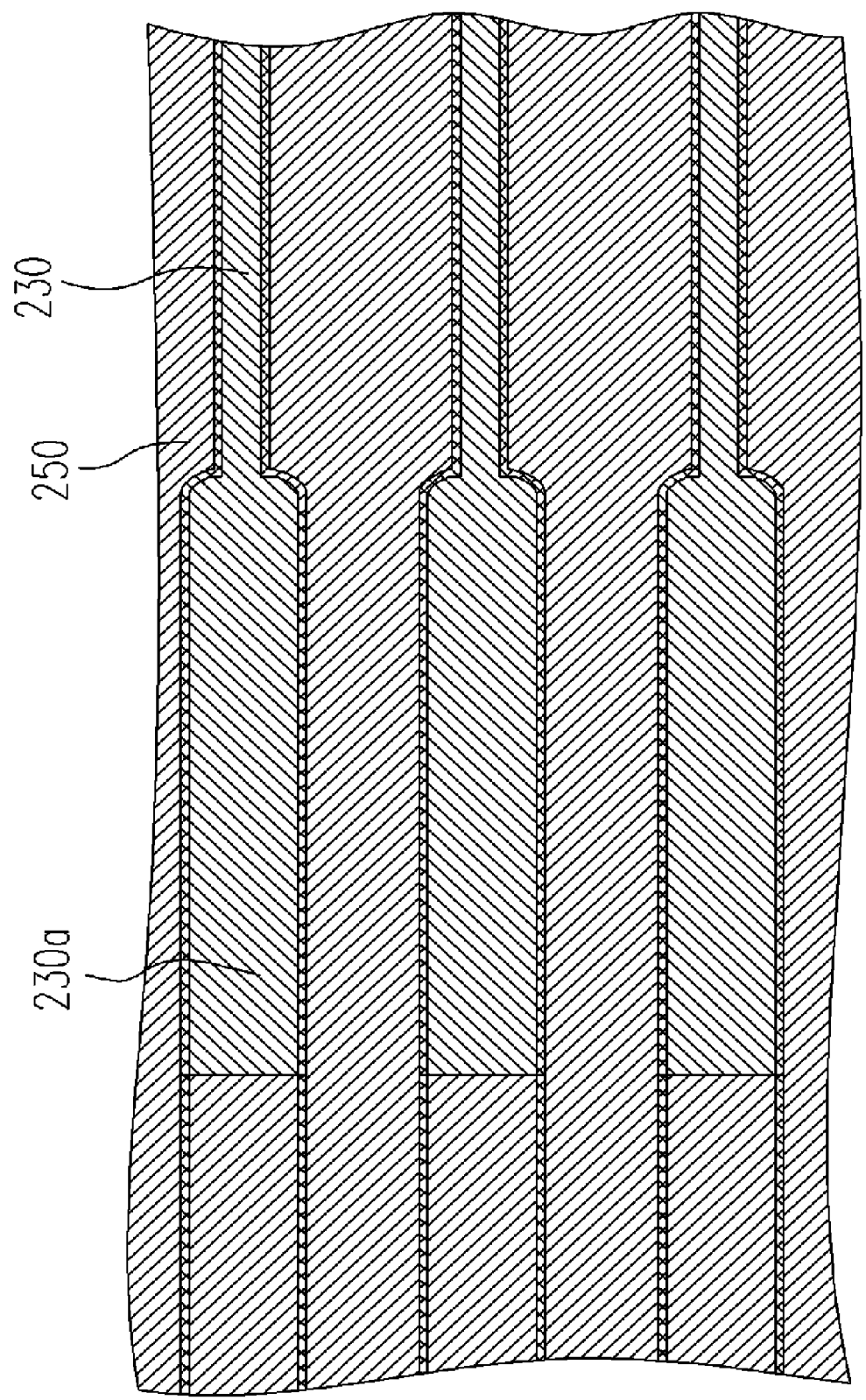
FIG. 5 is a schematic top view showing the first pads according to another embodiment of the present invention.
Figure 6:
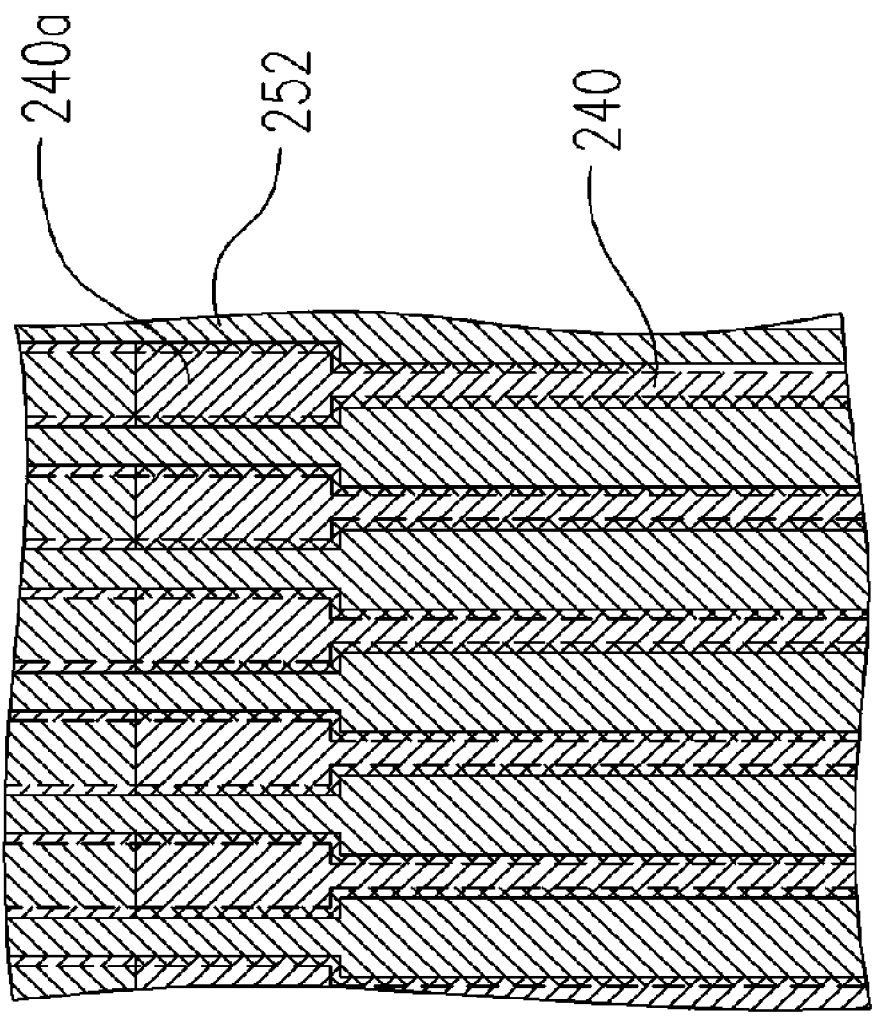
FIG. 6 is a schematic top view showing the second pads according to another embodiment of the present invention.

In another embodiment of the present invention, the first floating light-shielding layer 250 and the second floating light-shielding layer 252 further may extend into the first pads 230a and the second pads 240a to reduce light leakage at an angle. FIG. 5 and FIG. 6 are schematic top views showing the first pads and the second pads respectively according to another embodiment of the present invention. Referring to FIG. 5, the first floating light-shielding layer 250 extended to cover the gaps between the adjacent first pads 230a aside from the gaps between the adjacent first lead lines 230. Referring to FIG. 6, the second floating light-shielding layer 252 extended to cover the gaps between the adjacent second pads 240a aside from the gaps between the adjacent second lead lines 240.

Figure 7:
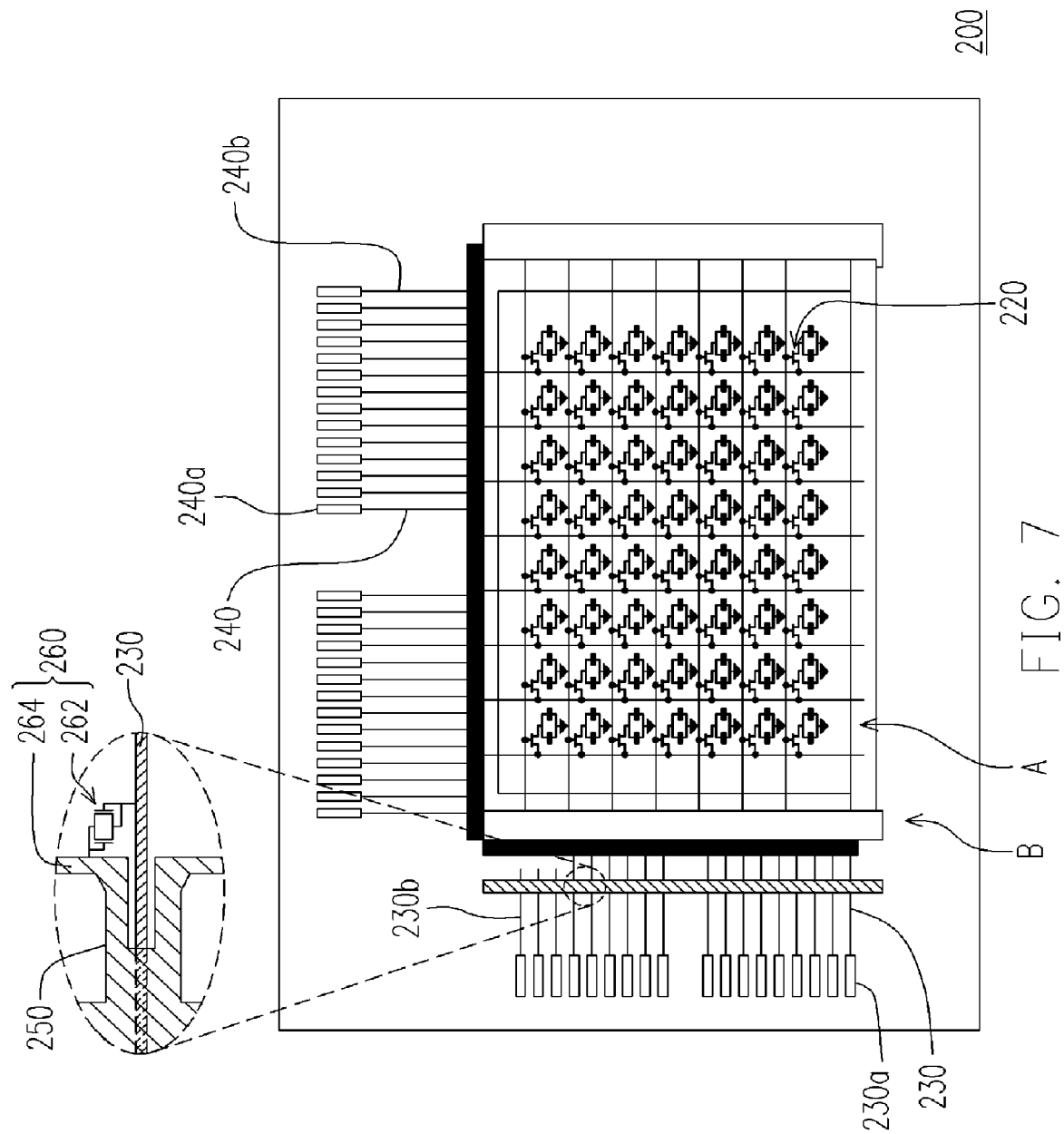
FIG. 7 to FIG. 9 is schematic diagrams showing the active devices array substrate according to the embodiments of the present invention respectively.

FIG. 7 is a schematic diagram showing the active devices array substrate according to the second embodiment of the present invention. Referring to FIG. 7, the active devices array substrate 200 further comprises a ESD protection circuit 260 disposed between the display region A and the first floating light-shielding layer 250 and electrically connected with the first floating light-shielding layer 250. Thus, the electrostatic charges on the first floating light-shielding layer 250 can be dissipated by the ESD protection circuit 260 to avoid the ESD damage caused between the first floating light-shielding layer 250 and the first lead lines 230.

The ESD protection circuit 260 may be the inner guard rings used in the conventional LCD for eliminating the electrostatic charges within the display region. More detailed, the ESD protection circuit 260, for example, comprises a plurality of protection rings 262 (only one of them is shown in FIG. 7 for illustrating) and a connecting wire 264. Wherein, the connecting wire 264 may be the same film layer with the first light-shielding layer 250. The protection rings 262 are electrically connected with each other through the connecting wire 264. The first floating light-shielding layer 250 is also electrically connected with the protection rings 262 through the connecting wire 264. Furthermore, each protection ring 262 is electrically connected with the corresponding first lead lines 230.

In more detail, each protection ring 262 is, for example, composed of a transistor. The protection rings 262 are turned on after inputting voltage signals into the first lead lines 230. At this time, if there are electrostatic charges resulted on the first floating light-shielding layer 250, the electrostatic charges may dissipate from the first floating light-shielding layer 250 through the connecting wire 264 and the protection rings 262 in sequence. It should be known that the ESD protection circuit 260 of the present invention is not limited to be the inner guard rings, it may be a circuit formed by an additional process in other embodiment of the present invention.

Similarly, the second floating light-shielding layer 252 may be electrically connected with a ESD protection circuit (not shown) to provide a dissipation path for the electrostatic charges on the second floating light-shielding layer 252. Thus, the ESD damage resulted between the second floating light-shielding layer 252 and the second lead lines 240 can be avoided. This ESD protection circuit is similar to the aforementioned ESD protection circuit.

Figure 8:
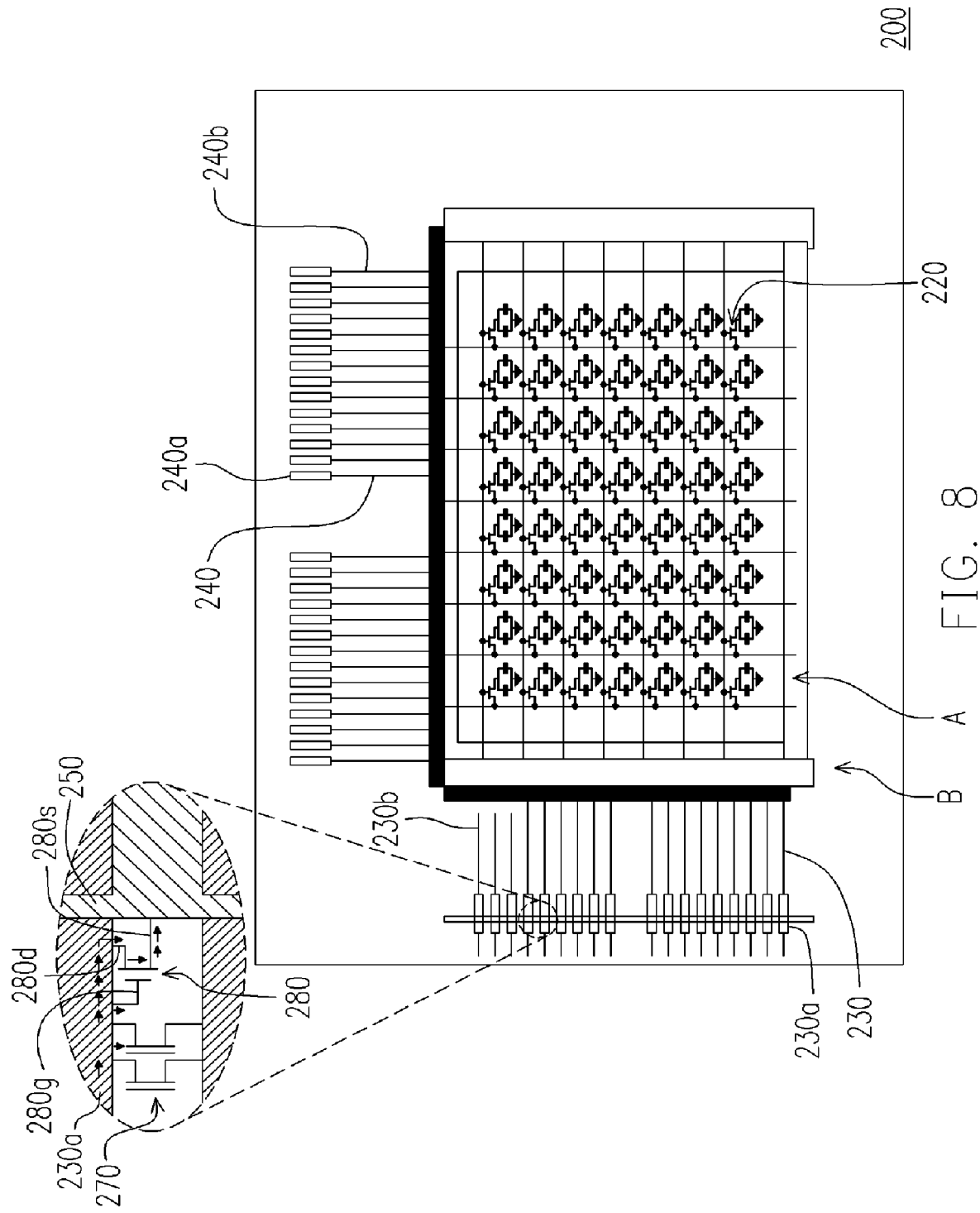

FIG. 8 is a schematic diagram showing the active devices array substrate according to the third embodiment of the present invention. Referring to FIG. 8, the ESD protection circuit 270 of this embodiment is electrically connected with the first pads 230a, and the first floating light-shielding layer 250 is disposed between the ESD protection circuit 270 and the display region A. Particularly, the active devices array substrate 200 of this embodiment further comprises a plurality of first electrostatic guiding devices 280 disposed between the ESD protection circuit 270 and the first floating light-shielding layer 250. Each of the first electrostatic guiding devices 280 is electrically connected with the corresponding first pad 230a and the first floating light-shielding layer 250.

In more detail, each first electrostatic guiding device 280, for example, is a transistor in this embodiment. A gate 280g and a drain 280d of the transistor are electrically connected with the corresponding first pad 230a, and a source 280s of the transistor is electrically connected with the first floating light-shielding layer 250. Although partial electrostatic charges can dissipate through path provided by the ESD protection circuit 270, but there are still a partial electrostatic charges moving into the display region A. In this moment, the gate 280g of the first electrostatic guiding device 280 is turned on by the voltage resulted by the electrostatic charges in a wink, then the electrostatic charges is dissipated to the first floating light-shielding layer 250 through the drain 280d and the source 280s in sequence. Thus, the first pads 230a and the first floating light-shielding layer 250 have the same electric potential so that the ESD damage can be prevented from resulting between the first pads 230a and the first floating light-shielding layer 250. In addition, the electrostatic charges are also consumed during the aforementioned process of turning on the gate 280g, so the first electrostatic guiding device 280 may prevent the ESD damage from resulting efficiently.

Figure 9:
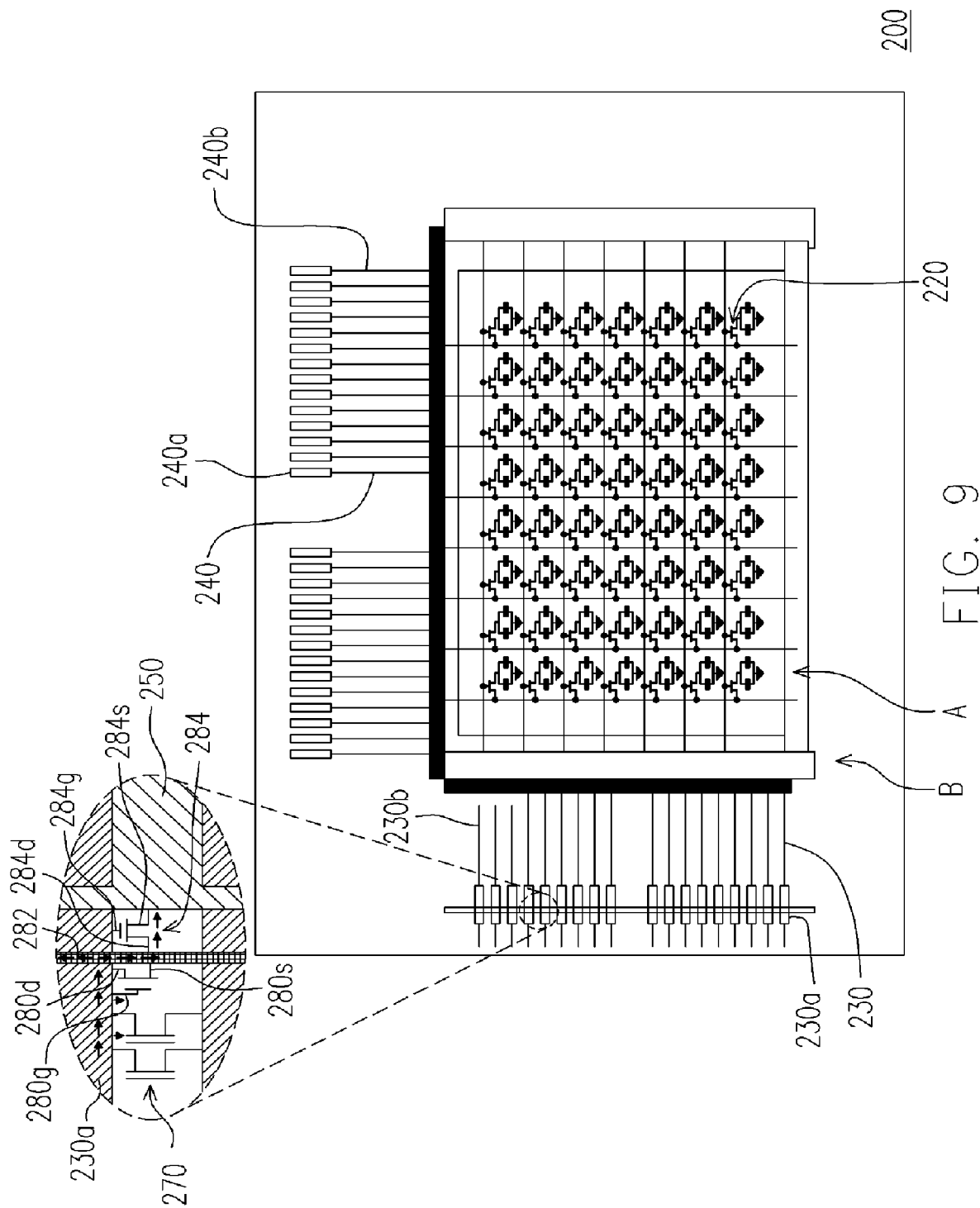

FIG. 9 is a schematic diagram showing the active devices array substrate according to the fourth embodiments of the present invention. Referring to FIG. 9, to increase the electrostatic dissipation function of the active devices array substrate 200, the active devices array substrate 200, for example, further comprises an electrostatic dissipation layer 282 and a plurality of second electrostatic guiding devices 284. The electrostatic dissipation layer 282 covers the partial first pads 230a, and the electrostatic dissipation layer 282 is disposed between the first electrostatic guiding devices 280 and the first floating light-shielding layer 250 to electrically connect with the first electrostatic guiding devices 280.

Moreover, the second electrostatic guiding devices 284 are electrically connected with a corresponding first pad 230a, the electrostatic dissipation layer 282 and the first floating light-shielding layer 250 respectively. Each the second electrostatic guiding device 284, for example, is a transistor with a gate 284g, a source 284s and a drain 284d. The gate 284g is electrically connected with a corresponding first pad 230a and the source 284s and the drain 284d are electrically connected with first floating light-shielding layer 250 and electrostatic dissipation layer 282 respectively. Therefore, the electrostatic charges may further be guided into the electrostatic dissipation layer 282 and dissipate to the first floating light-shielding layer 250 through the second electrostatic guiding devices 284. Thus, it is not only that the energy of the electrostatic charges can be substantially decreased, the first pads 230a and the first floating light-shielding layer 250 also have the same electric potential to make sure that the first pads 230a and the first floating light-shielding layer 250 can be prevented from the ESD damage.

Obviously, in the active devices array substrate 200 of this embodiment, a ESD protection circuit, first electrostatic guiding devices, a electrostatic dissipation layer or second electrostatic guiding devices as the aforementioned may be disposed near the second floating light-shielding layer 252 for providing a dissipation path to the electrostatic charges on the second floating light-shielding layer 252 or the second lead lines 240.

Figure 10:
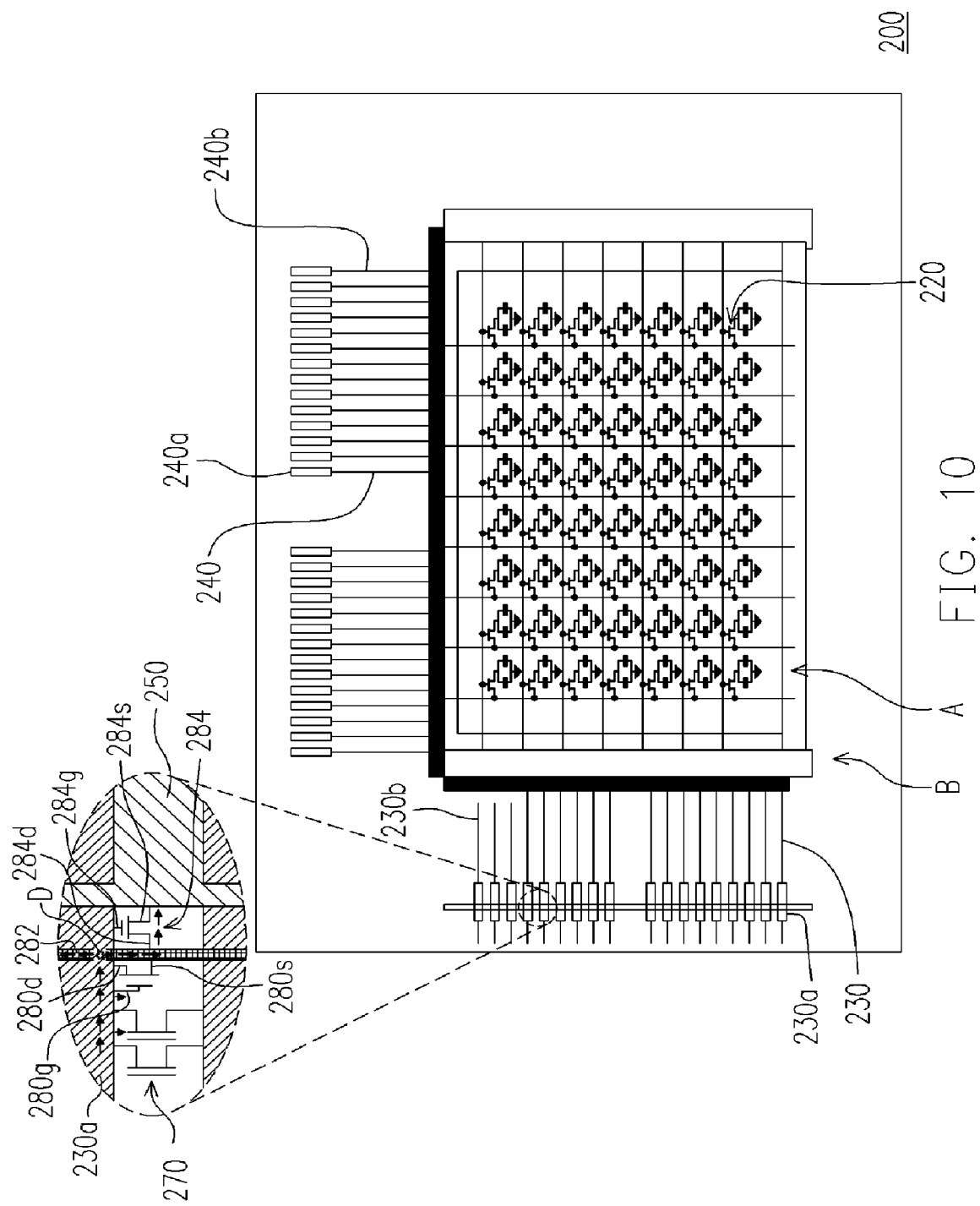
FIG. 10 is a schematic diagram showing the ESD damage occurred between the first lead lines and the electrostatic dissipation layer in FIG. 9.
Figure 11:
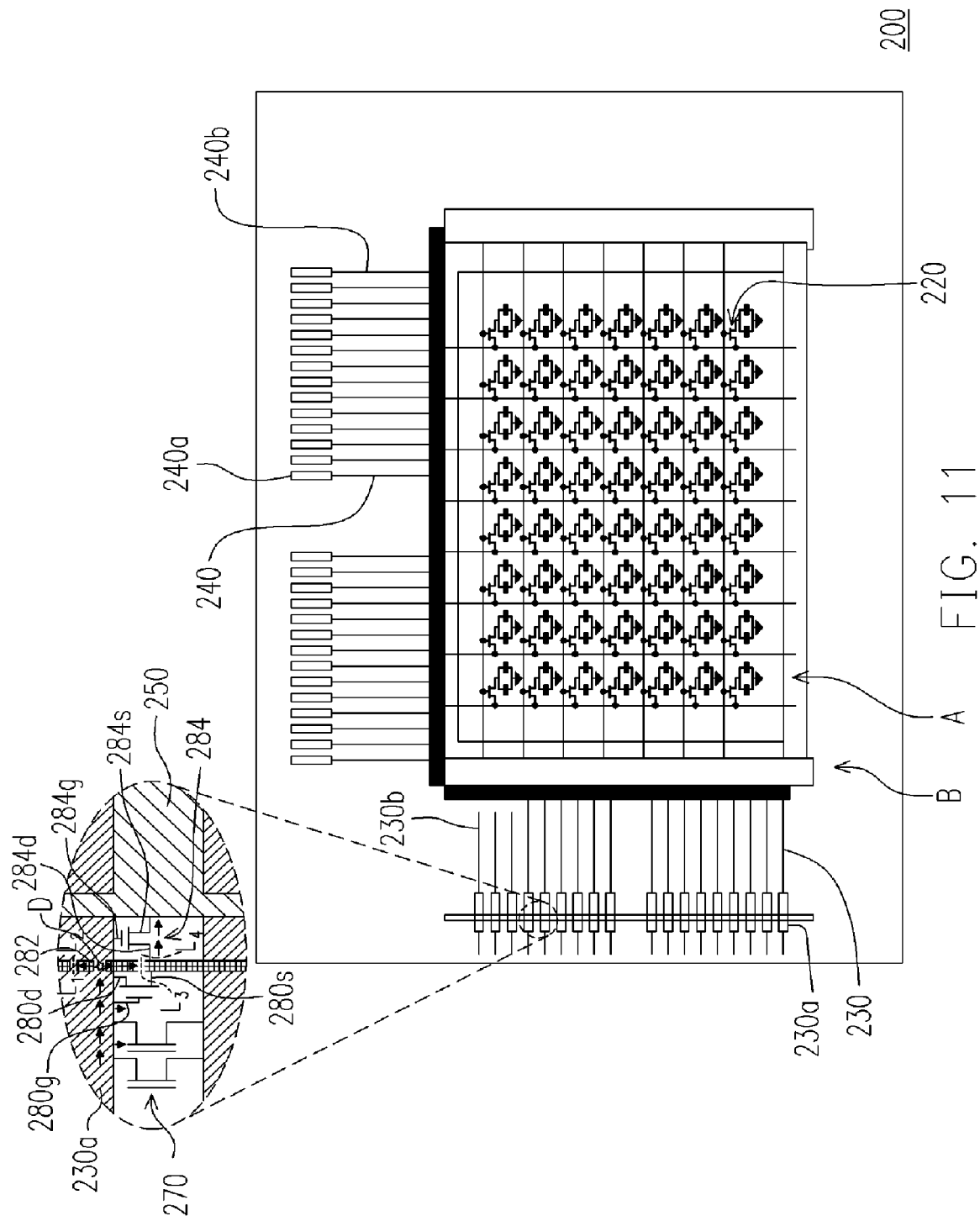
FIG. 11 is a schematic diagram showing a portion of the electrostatic dissipation layer with ESD damage is electrically isolated from the other portions of the electrostatic dissipation layer without ESD damage according to one embodiment of the present invention.

FIG. 10 is a schematic diagram showing the ESD damage occurred between the first lead lines and the electrostatic dissipation layer in FIG. 9. FIG. 11 is a schematic diagram showing a portion of the electrostatic dissipation layer with ESD damage is electrically isolated from the other portions of the electrostatic dissipation layer without ESD damage according to one embodiment of the present invention. Referring to FIG. 10, when the ESD damage is caused between the first pad 230a and the electrostatic dissipation layer 282 corresponding thereto (such as D point), the method for repairing the active devices array substrate 200 of the present invention is, for example, electrically isolating the portion of the electrostatic dissipation layer 282 subjecting to the ESD damage (such as D point) from the other portions of the electrostatic dissipation layer 282, as shown in FIG. 11. In more detail, the electrically isolating method of the electrostatic dissipation layer 282, for example, is cutting the electrostatic dissipation layer 282 along the dotted line L1-L2 and L3-L4 by using laser. Thus, although the electrostatic dissipation layer 282 at D point is shorted to the first pad 230a caused by the ESD damage, it would not affect the function of other circuits. In other words, the method can repair the active devices array substrate 200 from the ESD damage so that the display quality of the display device composed of the active devices array substrate 200 may be maintained.

In conclusion, the active devices array substrate and the repairing method thereof have at least the following characteristics and advantages:

1. The active devices array substrate of the present invention comprises the floating light-shielding layer sheltering the gaps between the first lead lines for preventing the light leakage. Hence, the display quality of the LCD composed of the active devices array substrate of the present invention may be maintained. Furthermore, the floating light-shielding layer of the present invention is not electrically connected with any voltage sources, so the power consumption of the LCD composed of the active devices array substrate of the present invention can be reduced and the LCD can be prevent from the over current.

2. The active devices array substrate of the present invention further comprises a design for protecting the ESD, such as the ESD protection circuit, the first electrostatic guiding devices, the second electrostatic guiding devices and the electrostatic dissipation layer etc. Therefore, the active devices array substrate of the present invention can be prevent from the ESD damage.

3. In the active devices array substrate with the electrostatic dissipation layer of the present invention, even the electrostatic dissipation layer is subjected the ESD damage, it can be repaired by electrically isolating the portion of the electrostatic dissipation layer with ESD damage from the portion of that without ESD damage in the present invention. Therefore, the active devices array substrate works without errors.

While the present invention has been described with embodiments, this description is not intended to limit our invention. Various modifications of the embodiment will be apparent to those skilled in the art. It is therefore contemplated that the appended claims will cover any such modifications or embodiments as fall within the true scope of the invention.

What is claimed is:

1. An active devices array substrate, comprising:
   a substrate having a display region and a peripheral circuit region;
   a plurality of active devices arranged within the display region on the substrate to form an array, wherein each of the active devices comprises a first conductive layer and a second conductive layer;
   a plurality of first lead lines disposed within the peripheral circuit region on the substrate, wherein the plurality of first lead lines and the first conductive layers are composed of the same film layer and electrically connected to each other;
   a plurality of second lead lines disposed within the peripheral circuit region on the substrate, wherein the plurality of first lead lines and the second conductive layers are composed of the same film layer and electrically connected to each other;
   a first floating light-shielding layer disposed between the first lead lines and partially covers the first lead lines, wherein the first floating light-shielding layer is not electrically connected with any voltage sources, the first floating light-shielding layer and the second conductive layer are composed of the same film layer; and
   a plurality of first dummy lead lines composed of the same film layer with the first conductive layer, wherein the first floating light-shielding layer exposes the plurality of first dummy lead lines.

2. The active devices array substrate of claim 1, further comprises a plurality of first pads disposed within the peripheral circuit region on the substrate, the first pads are electrically connected with the first lead lines respectively, and the first floating light-shielding layer further disposed corresponding to gaps between the first pads.

3. The active devices array substrate of claim 1, further comprises a second floating light-shielding layer disposed between the second lead lines and partially covers the second lead lines, wherein the second floating light-shielding layer is not electrically connected with any voltage sources, the second floating light-shielding layer and the first conductive layer are composed of the same film layer.

4. The active devices array substrate of claim 3, further comprises a plurality of second pads disposed within the peripheral circuit region on the substrate, the second pads are electrically connected with the second lead lines respectively, and the second floating light-shielding layer further disposed corresponding to gaps between the second pads.

5. The active devices array substrate of claim 3, further comprises a plurality of second dummy lead lines composed of the same film layer with the second conductive layer, and there are not any overlaps with the second floating light-shielding layer and the plurality of second dummy lead lines.

6. The active devices array substrate of claim 1, wherein the active devices are thin film transistors.

7. The active devices array substrate of claim 6, wherein each first conductive layer is gate layer, and each second conductive layer is source drain layer.

8. The active devices array substrate of claim 6, wherein each first conductive layer is source drain layer, and each second conductive layer is gate layer.

9. The active devices array substrate of claim 1, further comprises an electrostatic discharge protection circuit disposed between the display region and the first floating light-shielding layer on the substrate and electrically connected with the first floating light-shielding layer.

10. The active devices array substrate of claim 9, wherein the electrostatic discharge protection circuit comprises a plurality of guard rings and a connecting wire, the guard rings are electrically connected with each through the connecting wire, and the first floating light-shielding layer is electrically connected with the guard rings through the connecting wire.

11. The active devices array substrate of claim 10, wherein each of the guard rings is electrically connected with the corresponding one of the first lead lines.

12. The active devices array substrate of claim 2, further comprising:
   an electrostatic discharge protection circuit electrically connected with the first pads, wherein the first floating light-shielding layer is disposed between the electrostatic discharge protection circuit and the display region on the substrate; and
   a plurality of first electrostatic guiding devices disposed between the electrostatic discharge protection circuit and the first floating light-shielding layer, each of the first electrostatic guiding devices is electrically connected with the first floating light-shielding layer and the corresponding one of the first pads.

13. The active devices array substrate of claim 12, wherein each of the first electrostatic guiding devices is a transistor with a gate, a source and a drain, the gate and the drain are electrically connected with one of the first lead lines, and the source is electrically connected with the first floating light-shielding layer.

14. The active devices array substrate of claim 12, further comprises an electrostatic dissipation layer covering a portion of the first pads and disposed between the first electrostatic guiding devices and the first floating light-shielding layer to electrically connect with the first electrostatic guiding devices.

15. The active devices array substrate of claim 14, further comprises a plurality of second electrostatic guiding devices electrically connected with the electrostatic dissipation layer, the first floating light-shielding layer and the corresponding one of the first pads respectively.

16. The active devices array substrate of claim 15, wherein each of the second electrostatic guiding devices is a transistor with a gate, a source and a drain, the gate is electrically connected with one of the first pads, and the source and the drain are electrically connected with the first floating light-shielding layer and the electrostatic dissipation layer respectively.

17. A repairing method suited to repair the active devices array substrate of claim 14, comprising:

when an ESD damage is caused between the first pads and the electrostatic dissipation layer, electrically isolating a portion of the electrostatic dissipation layer without subjecting to the ESD damage from other portions of the electrostatic dissipation layer subjected to the ESD damage.

18. The repairing method of claim 17, wherein the electrically isolating method is laser cutting method.

* * * * *